(12) United States Patent
Xu et al.

(10) Patent No.: US 10,579,756 B2
(45) Date of Patent: Mar. 3, 2020

(54) SIMULATION METHOD OF SURFACE WATER FLOW MOVEMENT PROCESS IN SURFACE IRRIGATION

(71) Applicant: China Institute of Water Resources and Hydropower Research, Beijing (CN)

(72) Inventors: Di Xu, Beijing (CN); Shaohui Zhang, Beijing (CN); Meijian Bai, Beijing (CN); Yinong Li, Beijing (CN); Fuxiang Li, Beijing (CN)

(73) Assignee: CHINA INSTITUTE OF WATER RESOURCES AND HYDROPOWER RESEARCH, Beijing (CN)

( * ) Notice: Subject to any disclaimer, the term of this patent is extended or adjusted under 35 U.S.C. 154(b) by 0 days.

(21) Appl. No.: 15/544,160

(22) PCT Filed: Jun. 30, 2016

(86) PCT No.: PCT/CN2016/087882
§ 371 (c)(1),
(2) Date: Jul. 17, 2017

(87) PCT Pub. No.: WO2017/201813
PCT Pub. Date: Nov. 30, 2017

(65) Prior Publication Data
US 2019/0108297 A1  Apr. 11, 2019

(30) Foreign Application Priority Data

May 24, 2016 (CN) .......................... 2016 1 0349658

(51) Int. Cl.
*G06F 17/50* (2006.01)

(52) U.S. Cl.
CPC ...... *G06F 17/5018* (2013.01); *G06F 17/5009* (2013.01); *G06F 17/50* (2013.01); *G06F 2217/16* (2013.01)

(58) Field of Classification Search
CPC ............. G06F 17/5009; G06F 17/5018; G06F 2217/16; G06F 17/50
(Continued)

(56) References Cited

U.S. PATENT DOCUMENTS 8,065,124 B2 * 11/2011 Xu .......................... G06T 17/05
702/5
8,781,805 B1  7/2014 Sachs et al.
(Continued)

FOREIGN PATENT DOCUMENTS

CN   105243177 A   1/2016
CN   105353620 A   2/2016
(Continued)

OTHER PUBLICATIONS

Dong, Qin-ge, et al. "Coupled surface-subsurface flow hydrodynamic model for surface irrigation." 2013 Kansas City, Missouri, Jul. 21-24, 2013. American Society of Agricultural and Biological Engineers, 2013. pp. 1-14. (Year: 2013).*
(Continued)

*Primary Examiner* — Kamini S Shah
*Assistant Examiner* — John E Johansen
(74) *Attorney, Agent, or Firm* — Fay Sharpe LLP (57) ABSTRACT

A simulation method of a surface water movement process in surface irrigation, comprising: acquiring surface relative elevation data, border surface roughness coefficient data and surface water infiltration rate data of a target border check; substituting surface relative elevation data, border surface roughness coefficient data and surface water infiltration rate data into improved full hydrodynamic equations, and performing numerical solution on improved full hydrodynamic equations to obtain a simulated surface water depth value and simulated values of vertical integral average velocities of an irrigation water flow in x-coordinate and y-coordinate directions of a certain measurement site in the target border check at a certain time; and obtaining simulated values of unit width discharge of the irrigation water flow in x-coordinate and y-coordinate directions, respectively according to simulated surface water depth value and simulated values of
(Continued)

the vertical integral average velocities of the irrigation water flow in x-coordinate and y-coordinate directions.

10 Claims, 3 Drawing Sheets

(58) Field of Classification Search
USPC .............................................................. 703/9
See application file for complete search history.

(56) References Cited

U.S. PATENT DOCUMENTS

2006/0122794 A1* 6/2006 Sprague ................. G06Q 10/06
702/32
2016/0157073 A1* 6/2016 Ishikawa ................. H04W 4/90
455/404.1

FOREIGN PATENT DOCUMENTS

| KR | 101029282 B1 | * | 4/2011 |
| KR | 20110072551 A | * | 6/2011 |
| KR | 101219352 B1 | * | 1/2013 |
| KR | 20130045650 A | * | 5/2013 |
| WO | WO-2014192326 A1 | * | 12/2014 |

OTHER PUBLICATIONS

International Search Report and Written Opinion dated Mar. 2, 2017 from PCT/CN2016/087882.
Zhang, Shaohui et al., "One-dimensional Complete Hydrodynamic Model for Border Irrigation Based on Hybrid Numerical Method", Transactions of the Chinese Society of Agricultural Engineering, vol. 25, No. 9, Sep. 30, 2009 (Sep. 30, 2009), pp. 7-9, section 1.
International Search Report for PCT application PCT/CN2016/087882 dated Mar. 2, 2017.

* cited by examiner

SIMULATION METHOD OF SURFACE WATER FLOW MOVEMENT PROCESS IN SURFACE IRRIGATION

This application is a 371 of PCT Patent Application Serial No. PCT/CN2016/087882, filed Jun. 30, 2016, which claims the priority of the Chinese Patent Application Serial No. 201610349658.2, entitled as "Simulation Method of Surface Water Flow Movement Process in Surface Irrigation", filed to the Patent Office of the State Intellectual Property Office in China on May 24, 2016, which is incorporated herein by reference in its entirety.

TECHNICAL FIELD

The present invention is related to the technical field of farmland water conservancy, and more particularly, to a simulation method of a surface water flow movement process in surface irrigation.

BACKGROUND

Currently, surface irrigation is the most widely used farmland irrigation method. Thus, it is necessary to simulate a surface water flow movement process in surface irrigation, namely, a distribution state of an irrigation water flow infiltrating into soil, so as to design a surface irrigation system more rationally and to save water efficiently.

In the implementation process of the present invention, the inventor finds that there are at least the following problems: a relative error between the simulated surface water flow movement process data obtained by the related simulation method of the surface water flow movement process in the surface irrigation and measured data is large, resulting in poor simulation accuracy. Moreover, a numerical solution process of the classical full hydrodynamic equations used in the related simulation method of the surface water flow movement process in the surface irrigation is complicated.

SUMMARY

In order to solve the problems, the embodiments of the present invention provide a simulation method of a surface water flow movement process in surface irrigation, and the method is high in simulation accuracy and simple in the numerical solution process.

Particularly, the following technical solutions are involved.

A simulation method of a surface water flow movement process in surface irrigation comprises:

step a, acquiring surface relative elevation data, border surface roughness coefficient data and surface water infiltration rate data of a target border check;

step b, substituting the surface relative elevation data, the border surface roughness coefficient data and the surface water infiltration rate data into improved full hydrodynamic equations, and performing numerical solution on the improved full hydrodynamic equations to obtain a simulated surface water depth value and simulated values of vertical integral average velocities of an irrigation water flow in x-coordinate and y-coordinate directions of a certain measurement site in the target border check at a certain time, wherein the improved full hydrodynamic equations are expressed as:

$$\frac{\partial \zeta}{\partial t} = \frac{\partial}{\partial x}\left[K_w \frac{\partial \zeta}{\partial x}\right] + \frac{\partial}{\partial y}\left[K_w \frac{\partial \zeta}{\partial y}\right] - \frac{1}{g}\left\{\frac{\partial}{\partial x}[(\zeta - b)C_x K_w] + \frac{\partial}{\partial y}[(\zeta - b)C_y K_w]\right\} - i_c,$$

$$\frac{\partial \zeta}{\partial x} + u\frac{n^2 \sqrt{u^2 + v^2}}{h^{4/3}} = -C_x,$$

$$\frac{\partial \zeta}{\partial y} + v\frac{n^2 \sqrt{u^2 + v^2}}{h^{4/3}} = -C_y, \text{ and}$$

$$K_w = \frac{h^{5/3}}{n\left[\left(\frac{\partial \zeta}{\partial x} + C_x\right)^2 + \left(\frac{\partial \zeta}{\partial y} + C_y\right)^2\right]^{1/4}},$$

wherein h represents the surface water depth with the unit of m; x and y are spatial coordinates in two orthogonal directions respectively; u and v respectively represent the vertical integral average velocities of the irrigation water flow in the x-coordinate and y-coordinate directions, with the unit of m/s; g represents a gravitational acceleration with the unit of m/s$^2$; $\zeta$ represents the surface relative water level elevation with the unit of m, wherein $\zeta$=the surface water depth h+a surface relative elevation b; n is the border surface roughness coefficient with the unit of /m$^{1/3}$; and i$_c$ represents the surface water infiltration rate with the unit of m/s; and step c, obtaining simulated values of unit width discharge of the irrigation water flow in the x-coordinate and y-coordinate directions, respectively according to the simulated surface water depth value and the simulated value of the vertical integral average velocity of the irrigation water flow in the x-coordinate direction, and the simulated value of the vertical integral average velocity of the irrigation water flow in the y-coordinate direction.

Particularly, in step a, the acquisition of the surface water infiltration rate data of the target border check in particular includes: acquiring an infiltration parameter of a Kostiakov infiltration empirical equation and a dimensionless infiltration parameter of the Kostiakov infiltration empirical equation, and calculating the surface water infiltration rate data of the target border check according to the Kostiakov infiltration empirical equation.

The Kostiakov infiltration empirical equation is $i_c = \alpha k_{in} \tau^{\alpha-1}$, where $i_c$ represents the surface water infiltration rate with the unit of m/s; $\alpha$ is the dimensionless infiltration parameter of the Kostiakov infiltration empirical equation; $k_{in}$ is the infiltration parameter of the Kostiakov infiltration empirical equation, with the unit of cm/min$^\alpha$; and $\tau$ represents water infiltration time with the unit of s.

In particular, the infiltration parameter and the dimensionless infiltration parameter of the Kostiakov infiltration empirical equation are determined by use of a double ring infiltration method.

Particularly, in step a, the acquisition of the surface relative elevation data of the target border check in particular includes: measuring the surface relative elevation data by a level gauge at a predetermined interval distance.

Particularly, the predetermined interval distance is 5 m.

In particular, the acquisition of the border surface roughness coefficient data of the target border check particularly includes: observing surface water depth of the target border check to acquire surface water depth observation data of the target border check, and estimating the border surface roughness coefficient according to the surface water depth observation data.

Particularly, in step b, the numerical solution of the improved full hydrodynamic equations is performed by use of a finite volume method.

Particularly, in step c, the simulated values of the unit width discharge of the irrigation water flow in the x-coordinate and y-coordinate directions are calculated by use of following equations: $q_x=h \cdot u$, and $q_y=h \cdot v$, wherein $q_x$ and $q_y$ respectively represent the unit width discharges of the irrigation water flow in the x-coordinate and y-coordinate directions, with the unit of $m^3/(s \cdot m)$; h represents the surface water depth with the unit of m; and u and v respectively represent the vertical integral average velocities of the irrigation water flow in the x-coordinate and y-coordinate directions, with the unit of m/s.

The technical solutions of the embodiments of the present invention have the following advantageous effects.

In the simulation method of the surface water flow movement process in the surface irrigation, provided by the embodiments of the present invention, the simulated surface water depth value and the simulated values of the vertical integral average velocities of the irrigation water flow in the x-coordinate and y-coordinate directions at the certain measurement site of the target border check at the certain time are obtained by solving the improved full hydrodynamic equations, so that the surface water flow movement process in the surface irrigation is simulated. A mathematical property of the improved full hydrodynamic equations is parabolic, while the mathematical property of the classical full hydrodynamic equations is hyperbolic, so that under a specific water flow physical condition of the surface irrigation, compared with the classical full hydrodynamic equations, a relative error between a simulated result of the surface water flow movement process in the surface irrigation obtained by the improved full hydrodynamic equations and an measured result is minor, and thus the simulation accuracy is higher. Meanwhile, compared with the classical full hydrodynamic equations, the numerical solution of the improved full hydrodynamic equations is easier, improving the simulation efficiency of the surface water flow movement process in the surface irrigation.

BRIEF DESCRIPTION OF THE DRAWINGS

To clearly describe the technical solutions of the embodiments of the present invention, the followings will briefly describe the drawings for illustrating the embodiments of the present invention.

In FIGS. 1-6, solid lines represent the simulated values, and dotted lines represent the measured values.

DETAILED DESCRIPTION

To make the objectives, technical solutions and advantages of the present invention more clear, the followings will describe the embodiments of the present invention in detail. Unless otherwise defined, all technical terms used in the embodiments of the present invention have the same meaning as commonly understood by those skilled in the art.

The embodiments of the present invention provide a simulation method of a surface water flow movement process in surface irrigation, and the simulation method comprises the steps as follows.

In step 1, surface relative elevation data, border surface roughness coefficient data and surface water infiltration rate data of a target border check are acquired.

In step 2, the surface relative elevation data, the border surface roughness coefficient data and the surface water infiltration rate data are substituted into improved full hydrodynamic equations, and numerical solution is performed on the improved full hydrodynamic equations to obtain a simulated surface water depth value and simulated values of vertical integral average velocities of an irrigation water flow in x-coordinate and y-coordinate directions of a certain measurement site in the target border check at a certain time, wherein the improved full hydrodynamic equations are expressed as:

$$\frac{\partial \zeta}{\partial t} = \frac{\partial}{\partial x}\left[K_w \frac{\partial \zeta}{\partial x}\right] + \frac{\partial}{\partial y}\left[K_w \frac{\partial \zeta}{\partial y}\right] - \frac{1}{g}\left\{\frac{\partial}{\partial x}[(\zeta-b)C_x K_w] + \frac{\partial}{\partial y}[(\zeta-b)C_y K_w]\right\} - i_c,$$

$$\frac{\partial \zeta}{\partial x} + u\frac{n^2 \sqrt{u^2+v^2}}{h^{4/3}} = -C_x,$$

$$\frac{\partial \zeta}{\partial y} + v\frac{n^2 \sqrt{u^2+v^2}}{h^{4/3}} = -C_y, \text{ and}$$

$$K_w = \frac{h^{5/3}}{n\left[\left(\frac{\partial \zeta}{\partial x}+C_x\right)^2 + \left(\frac{\partial \zeta}{\partial y}+C_y\right)^2\right]^{1/4}}.$$

Here, h represents the surface water depth with the unit of m; x and y are spatial coordinates in two orthogonal directions respectively; u and v respectively represent the vertical integral average velocities of the irrigation water flow in the x-coordinate and y-coordinate directions, with the unit of m/s; g represents a gravitational acceleration with the unit of $m/s^2$; $\zeta$ represents the surface relative water level elevation with the unit of m, wherein $\zeta$=the surface water depth h+a surface relative elevation b; n is the border surface roughness coefficient with the unit of $s/m^{1/3}$; and $i_c$ represents the surface water infiltration rate with the unit of m/s.

In step 3, simulated values of unit width discharge of the irrigation water flow in the x-coordinate and y-coordinate directions are obtained, respectively, according to the simulated surface water depth value, the simulated value of the vertical integral average velocity of the irrigation water flow in the x-coordinate direction, and the simulated value of the vertical integral average velocity of the irrigation water flow in the y-coordinate direction.

In the simulation method of the surface water flow movement process in the surface irrigation, provided by the embodiments of the present invention, the simulated surface water depth value and the simulated values of the vertical integral average velocities of the irrigation water flow in the x-coordinate and y-coordinate directions of the certain measurement site in the target border check at the certain time are obtained by numerically solving the improved full hydrodynamic equations, so that the surface water flow movement process in the surface irrigation is simulated. By comparing the improved full hydrodynamic equations with the classical full hydrodynamic equations, it can be seen that a mathematical property of the improved full hydrodynamic equations is parabolic, while the mathematical property of the classical full hydrodynamic equations is hyperbolic, and moreover, the surface water flow movement process in the surface irrigation belongs to shallow water flow processes, so that under a specific water flow physical condition of the surface irrigation, compared with the classical full hydrodynamic equations, a relative error between a simulated result of the surface water flow movement process in the surface irrigation obtained by the improved full hydrodynamic equations and a measured result is minor, and thus the simulation accuracy is higher. Meanwhile, compared with the classical full hydrodynamic equations, the numerical solution of the improved full hydrodynamic equations is easier, improving the simulation efficiency of the surface water flow movement process in the surface irrigation.

It is understood by those skilled in the art that the surface relative elevation data, the border surface roughness coefficient data and the surface water infiltration rate data in step 1 of the simulation method provided by the embodiments of the present invention are measured data, and can be acquired by carrying out a soil infiltration test and a surface water depth observation test.

The acquisition of the surface water infiltration rate data of the target border check in particular includes: acquiring an infiltration parameter of a Kostiakov infiltration empirical equation and a dimensionless infiltration parameter of the Kostiakov infiltration empirical equation, and calculating the surface water infiltration rate data of the target border check according to the Kostiakov infiltration empirical equation.

The Kostiakov infiltration empirical equation is $i_c = \alpha k_{in} \tau^{\alpha-1}$, where $i_c$ represents the surface water infiltration rate with the unit of m/s; $\alpha$ is the dimensionless infiltration parameter of the Kostiakov infiltration empirical equation; $k_{in}$ is the infiltration parameter of the Kostiakov infiltration empirical equation, with the unit of cm/min$^\alpha$; and $\tau$ represents water infiltration time with the unit of s.

The infiltration parameter and the dimensionless infiltration parameter of the Kostiakov infiltration empirical equation may be determined by a test result of a double ring infiltration method that is a commonly used soil infiltration parameter measurement method. Devices used in the double ring infiltration method mainly comprise an inner ring and an outer ring which are concentric with each other, as well as a mariotte bottle. In the double ring infiltration method, the inner ring and the outer ring are inserted into a certain depth of soil, the mariotte bottle is configured to inject water into the inner ring, and changes of water levels in the mariotte bottle over time are continuously observed and recorded.

It is understood by those skilled in the art that within a target border check, currently, numerous soil infiltration parameter measurement sites are set, and infiltration parameters of the Kostiakov infiltration empirical equation and dimensionless infiltration parameters of the Kostiakov infiltration empirical equation finally obtained from the all measurement sites may be different. When values of the infiltration parameters of the Kostiakov infiltration empirical equation and the dimensionless infiltration parameters of the Kostiakov infiltration empirical equation from the all measurement sites are different, during calculating the surface water infiltration rate of the target border check, the average of the infiltration parameters of the Kostiakov infiltration empirical equation from the all measurement sites serves as the infiltration parameter of the Kostiakov infiltration empirical equation, and the average of the dimensionless infiltration parameters of the Kostiakov infiltration empirical equation from the all measurement sites serves as the dimensionless infiltration parameter of the Kostiakov infiltration empirical equation.

Those skilled in the art can also use other conventional methods for acquiring surface water infiltration rate data in the art to acquire the surface water infiltration rate data of the target border check.

Particularly, the acquisition of the surface relative elevation data of the target border check includes: measuring the surface relative elevation data by a level gauge at a predetermined interval distance. Here, the predetermined interval distance may be 5 m, or may be 4 m, 6 m, 8 m, 10 m, etc. A person skilled in the art may set the distance based on an actual situation.

In particular, the acquisition of the border surface roughness coefficient data of the target border check includes: observing surface water depth of the target border check to acquire surface water depth observation data of the target border check, and estimating the border surface roughness coefficient according to the surface water depth observation data. It is understood by those skilled in the art that roughness coefficients at different locations of the target border check may be different, and the average of the roughness coefficients at the different locations of the target border check may serve as the roughness coefficient of the target border check.

Further, in step 2 of the simulation method provided by the embodiments of the present invention, the numerical solution of the improved full hydrodynamic equations is performed by use of a finite volume method. The selection of an initial condition, a boundary condition and the like involved in the numerical solution by use of the finite volume method is carried out based on conventional technical means in the art. Those skilled in the art can also use other conventional numerical solution methods, such as a finite difference method and a finite element method, in the art to numerically solve the improved full hydrodynamic equations.

Further, in step 3 of the simulation method provided by the embodiments of the present invention, the simulated values of the unit width discharge of the irrigation water flow in the x-coordinate and y-coordinate directions are calculated by use of following equations: $q_x = h \cdot u$, and $q_y = h \cdot v$, where $q_x$ and $q_y$ respectively represent the unit width discharges of the irrigation water flow in the x-coordinate and y-coordinate directions, with the unit of m$^3$/(s·m); h represents the surface water depth with the unit of m; and u and v respectively represent the vertical integral average velocities of the irrigation water flow in the x-coordinate and y-coordinate directions, with the unit of m/s.

Further, in the simulation method provided by the embodiments of the present invention, the x-coordinate and y-coordinate directions may be any two orthogonal directions in the target border check, and a person skilled in the art may select the directions based on the actual situation. For example, the length direction of the target border check may serve as the x-coordinate direction, and the width direction of the target border check may serve as the y-coordinate direction.

The simulation method of the surface water flow movement process in the surface irrigation, provided by the embodiments of the present invention will be described in further detail with reference to particular surface irrigation data hereinafter, and the accuracy of the simulation method provided by the embodiments of the present invention will be evaluated.

In the following embodiments, the length direction and the width direction of the target border check are used as the x-coordinate direction and the y-coordinate direction, respectively.

Embodiment 1

In this embodiment, a field with a size of 50 m×50 m in Yehe irrigation district, Hebei province in China was selected as a target border check. A surface water flow movement process during winter irrigation of winter wheat in this target border check is simulated by use of the simulation method provided by the present invention. Particularly, the simulation method comprises the steps as follows.

In step 101, a soil infiltration test is carried out by use of a double ring infiltration method to determine an infiltration parameter of a Kostiakov infiltration empirical equation and a dimensionless infiltration parameter of the Kostiakov infiltration empirical equation, and a surface water infiltration rate $i_c$ of the target border check is calculated through the Kostiakov infiltration empirical equation: $i_c = \alpha k_{in} \tau^{\alpha-1}$, wherein $\alpha$ represents the dimensionless infiltration parameter of the Kostiakov infiltration empirical equation, and the average of values of test dimensionless infiltration parameters of all measurement sites in the target border check serves as $\alpha$; $k_{in}$ represents the infiltration parameter of the Kostiakov infiltration empirical equation, and the average of values of test infiltration parameters of the all measurement sites in the target border check serves as $k_{in}$; and $\tau$ represents water infiltration time with the unit of s.

In step 102, the surface relative elevation data is measured by a level gauge at an interval distance of 5 m.

In step 103, a surface water depth observation test of the target border check is carried out to acquire surface water depth observation data of the target border check, and a border surface roughness coefficient is estimated according to the surface water depth observation data. In this embodiment, the average of the test border surface roughness coefficients of the all measurement sites in the target border check serves as the border surface roughness coefficient n.

The order of the above steps 101-103 is not strictly limited. In this embodiment, the infiltration parameter of the Kostiakov infiltration empirical equation, the dimensionless infiltration parameter of the Kostiakov infiltration empirical equation, the surface relative elevation and the border surface roughness coefficient are obtained based on winter wheat winter irrigation experiment data of the target border check in 2008. The specific values of the above data are shown in table 1.

In step 104, the surface relative elevation data, the border surface roughness coefficient data and the surface water infiltration rate data obtained in steps 101-103 are substituted into improved full hydrodynamic equations, and numerical solution of the improved full hydrodynamic equations is carried out by use of a finite volume method to obtain a simulated surface water depth value and simulated values of vertical integral average velocities of an irrigation water flow in x-coordinate and y-coordinate directions of a certain measurement site in the target border check at a certain time, wherein the improved full hydrodynamic equations are expressed as:

$$\frac{\partial \zeta}{\partial t} = \frac{\partial}{\partial x}\left[K_w \frac{\partial \zeta}{\partial x}\right] + \frac{\partial}{\partial y}\left[K_w \frac{\partial \zeta}{\partial y}\right] - \frac{1}{g}\left\{\frac{\partial}{\partial x}[(\zeta-b)C_x K_w] + \frac{\partial}{\partial y}[(\zeta-b)C_y K_w]\right\} - i_c,$$

$$\frac{\partial \zeta}{\partial x} + u\frac{n^2 \sqrt{u^2+v^2}}{h^{4/3}} = -C_x,$$

$$\frac{\partial \zeta}{\partial y} + v\frac{n^2 \sqrt{u^2+v^2}}{h^{4/3}} = -C_y, \text{ and}$$

$$K_w = \frac{h^{5/3}}{n\left[\left(\frac{\partial \zeta}{\partial x} + C_x\right)^2 + \left(\frac{\partial \zeta}{\partial y} + C_y\right)^2\right]^{1/4}}.$$

Here, h represents the surface water depth with the unit of m; x and y are spatial coordinates in the length direction of the target border check and the width direction of the target border check respectively; u and v respectively represent the vertical integral average velocities of the irrigation water flow in the x-coordinate and y-coordinate directions, with the unit of m/s; g represents a gravitational acceleration with the unit of m/s$^2$; $\zeta$ represents the surface relative water level elevation with the unit of m, wherein $\zeta$=the surface water depth h+a surface relative elevation b; n is the border surface roughness coefficient with the unit of s/m$^{1/3}$; and $i_c$ represents the surface water infiltration rate with the unit of m/s.

In step 105, the simulated surface water depth value and the simulated values of the vertical integral average velocities of the irrigation water flow in the x-coordinate and y-coordinate directions are substituted into the equations: $q_x = h \cdot u$, and $q_y = h \cdot v$, so that simulated values of unit width discharge of the irrigation water flow in the x-coordinate direction and y-coordinate directions are obtained, respectively. Here, $q_x$ and $q_y$ respectively represent the unit width discharges of the irrigation water flow in the x-coordinate and y-coordinate directions, with the unit of m$^3$/(s·m); h represents the surface water depth with the unit of m; and u and v respectively represent the vertical integral average velocities of the irrigation water flow in the x-coordinate and y-coordinate directions, with the unit of m/s.

TABLE 1

| No. | Size of border check (m × m) | Unit width discharge of water flowing into field q (L/(s · m)) | Inflow form | Standard deviation of border surface relative elevation $S_d$ (cm) | Irrigation time t (min) | Parameters of Kostiakov infiltration empirical equation | | Border surface roughness coefficient n (s/m$^{1/3}$) |
|---|---|---|---|---|---|---|---|---|
| | | | | | | $k_{in}$ (cm/min$^\alpha$) | $\alpha$ | |
| 1 | 50 × 50 | 0.83 | Fan-shaped | 2.18 | 40 | 0.0723 | 0.50 | 0.08 |

Comparative Embodiment 1

The comparative embodiment uses the following simulation method to simulate a surface water flow movement process in surface irrigation of the target border check in the embodiment 1. T simulation method comprises the following steps: according to a surface relative elevation, a border surface roughness coefficient and a surface water infiltration rate, simulated value data comprising a simulated surface water depth value, a simulated value of a vertical integral average velocity of an irrigation water flow in an x-coordinate direction, and a simulated value of a vertical integral average velocity of the irrigation water flow in a y-coordinate direction, of a certain measurement site in a border check at a certain time is calculated by use of classical full hydrodynamic equations, and a product of the simulated surface water depth value and the simulated value of the vertical integral average velocity in the x-coordinate direction and a product of the simulated surface water depth value and the simulated value of the vertical integral average velocity in the y-coordinate direction, respectively are calculated, so as to obtain a simulated value of unit width discharge in the x-coordinate direction and a simulated value of unit width discharge in the y-coordinate direction. The classical full hydrodynamic equations are expressed as follows:

$$\frac{\partial h}{\partial t} + \frac{\partial q_x}{\partial x} + \frac{\partial q_y}{\partial y} = -i_c,$$

$$\frac{\partial q_x}{\partial t} + \frac{\partial}{\partial x}(q_x u) + \frac{\partial}{\partial y}(q_x v) = -gh\frac{\partial \zeta}{\partial x} - g\frac{n^2 u\sqrt{u^2+v^2}}{h^{1/3}}, \text{ and}$$

$$\frac{\partial q_y}{\partial t} + \frac{\partial}{\partial x}(q_y u) + \frac{\partial}{\partial y}(q_y v) = -gh\frac{\partial \zeta}{\partial y} - g\frac{n^2 v\sqrt{u^2+v^2}}{h^{1/3}}.$$

In the above equations, h represents the surface water depth with the unit of m; x and y are spatial coordinates in two orthogonal directions respectively; u and v respectively represent the vertical integral average velocities in the x-coordinate and y-coordinate directions, with the unit of m/s; $q_x$ and $q_y$ respectively represent the unit width discharges in the x-coordinate and y-coordinate directions, with the unit of m³/(s·m), wherein $q_x=h\cdot u$, $q_y=h\cdot v$; q represents a gravitational acceleration with the unit of m/s²; $\zeta$ represents the surface relative water level elevation, with the unit of m, wherein $\zeta$=the surface water depth h+a surface relative elevation b; n is a border surface roughness coefficient with the unit of $s/m^{1/3}$; and $i_c$ represents the surface water infiltration rate with the unit of m/s.

The difference between the comparative embodiment and the embodiment 1 lies in that the surface relative elevation data, the border surface roughness coefficient data and the surface water infiltration rate data are substituted into classical full hydrodynamic equations, and a finite volume method is configured to numerously solve the classical full hydrodynamic equations.

Embodiment 2

In this embodiment, a field with a size of 80 m×50 m in a regiment of the Xinjiang Production and Construction Corps is selected as a target border check, and a surface water flow movement process during spring irrigation of winter wheat in this target border check is simulated.

Particularly, a simulation method is the same as that in the embodiment 1.

In this embodiment, the infiltration parameter of the Kostiakov infiltration empirical equation, the dimensionless infiltration parameter of the Kostiakov infiltration empirical equation, the surface relative elevation and the border surface roughness coefficient are obtained based on winter wheat spring irrigation experiment data of the target border check in 2010. The specific values of the above data are shown in table 2.

TABLE 2

| No. | Size of border check (m × m) | Unit width discharge of water flowing into field q (L/(s · m)) | Inflow form | Standard deviation of border surface relative elevation $S_d$ (cm) | Irrigation time t (min) | Parameters of Kostiakov infiltration empirical equation $k_{in}$ (cm/min$^\alpha$) | α | Border surface roughness coefficient n (s/m$^{1/3}$) |
|---|---|---|---|---|---|---|---|---|
| 2 | 80 × 50 | 1.04 | Angular | 3.58 | 70 | 0.1134 | 0.39 | 0.09 |

Comparative Embodiment 2

The comparative embodiment uses the simulation method presented in Comparative Embodiment 1 to simulate a surface water flow movement process in surface irrigation of the target border check in the embodiment 2.

The difference between the comparative embodiment and the embodiment 2 lies in that that the surface relative elevation data, the border surface roughness coefficient data and the surface water infiltration rate data are substituted into classical full hydrodynamic equations, and a finite volume method is configured to numerously solve the classical full hydrodynamic equations.

Embodiment 3

In this embodiment, a field with a size of 200 m×60 m in a regiment of the Xinjiang Production and Construction Corps is selected as a target border check, and a surface water flow movement process during spring irrigation of winter wheat in this target border check is simulated.

Particularly, a simulation method is the same as that in the embodiment 1.

In this embodiment, the infiltration parameter of the Kostiakov infiltration empirical equation, the dimensionless infiltration parameter of the Kostiakov infiltration empirical equation, the surface relative elevation and the border surface roughness coefficient are obtained based on winter wheat spring irrigation experiment data of the target border check in 2010. The specific values of the above data are shown in table 3.

TABLE 3

| No. | Size of border check (m × m) | Unit width discharge of water flowing into field q (L/(s · m)) | Inflow form | Standard deviation of border surface relative elevation $S_d$ (cm) | Irrigation time t (min) | Parameters of Kostiakov infiltration empirical equation | | Border surface roughness coefficient n (s/m$^{1/3}$) |
|---|---|---|---|---|---|---|---|---|
| | | | | | | $k_{in}$ (cm/min$^\alpha$) | $\alpha$ | |
| 3 | 200 × 60 | 1.10 | Linear | 6.15 | 150 | 0.1282 | 0.36 | 0.10 |

Comparative Embodiment 3

The comparative embodiment uses the simulation method presented in Comparative Embodiment 1 to simulate a surface water flow movement process in surface irrigation of the target border check in the embodiment 3.

The difference between the comparative embodiment and the embodiment 3 lies in that that the surface relative elevation data, the border surface roughness coefficient data and the surface water infiltration rate data are substituted into classical full hydrodynamic equations, and a finite volume method is configured to numerously solve the classical full hydrodynamic equations.

Embodiment 4

In this embodiment, simulated values of an advance time and a recession time of a surface water flow are determined based on the simulated surface water depth values obtained in the embodiments 1-3 and the comparative embodiments 1-3, respectively. Moreover, an average relative error between simulated values and measured values of the advance time as well as an average relative error between simulated values and measured values of the recession time is calculated. In addition, the simulation accuracies of the simulation method provided by the present invention and the existing simulation method are respectively evaluated by comparing the average relative errors between the simulated values and the measured values in embodiments 1-3 and the comparative embodiments 1-3.

The advance time of the surface water flow refers to the time when the surface water depth value begins to greater than 0, and the recession time of the surface water flow refers to the time when the surface water depth value changes to 0.

A calculation formula of the average relative error between the simulated values and the measured values of the advance time of the surface water flow is as follows:

$$ARE_{adv} = \sum_{i=1}^{M} \frac{|t^o_{adv,i} - t^s_{adv,i}|}{t^o_{adv,i}} \times 100\%.$$

Here, $t_{adv,i}^o$ and $t_{adv,i}^s$ respectively represent a measured value and a simulated value of the time for the surface water flow to advance to an i-th measurement site in the target border check, with the unit of min; and M represents the number of the measurement sites in the target border check.

A calculation formula of the average relative error between the simulated values and the measured values of the recession time of the surface water flow is as follows:

$$ARE_{rec} = \sum_{i=1}^{M} \frac{|t^o_{rec,i} - t^s_{rec,i}|}{t^o_{rec,i}} \times 100\%.$$

Here, $t_{rec,i}^o$ and $t_{rec,i}^s$ respectively represent a measured value and a simulated value of the recession time of the surface water flow at the i-th measurement site in the target border check, with the unit of min; and M represents the number of the measurement sites in the target border check.

The average relative errors between the simulated values and the measured values of the advance time and the recession time of the surface water flow in the embodiments 1-3 and the comparative embodiments 1-3 are shown in table 4.

TABLE 4

| | Average relative error of advance times ARE$_{adv}$ | Average relative error of recession times ARE$_{rec}$ |
|---|---|---|
| Embodiment 1 | 5.88 | 9.15 |
| Comparative embodiment 1 | 6.13 | 11.95 |
| Embodiment 2 | 6.81 | 10.36 |
| Comparative embodiment 2 | 9.68 | 15.25 |
| Embodiment 3 | 7.44 | 11.92 |
| Comparative embodiment 3 | 12.68 | 18.21 |

Figure 1:
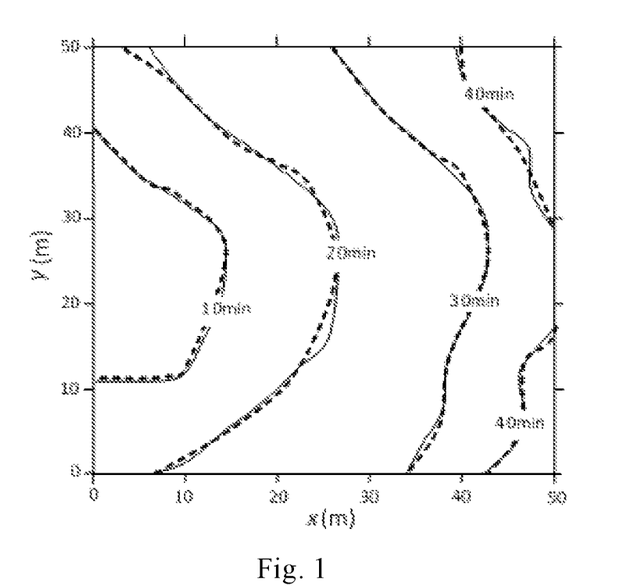
FIG. 1 is a comparison diagram between simulated values and measured values of a surface water flow advance process according to an embodiment 1.
Figure 2:
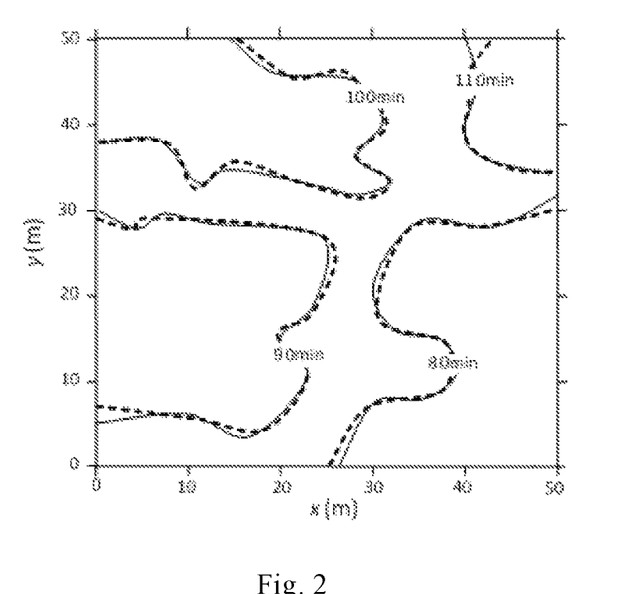
FIG. 2 is a comparison diagram between simulated values and measured values of a surface water flow recession process according to the embodiment 1.
Figure 3:
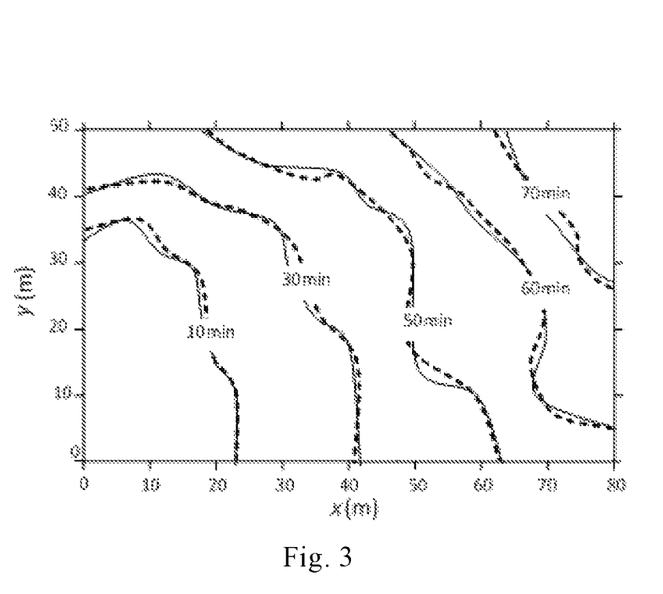
FIG. 3 is a comparison diagram between simulated values and measured values of a surface water flow advance process according to an embodiment 2.
Figure 4:
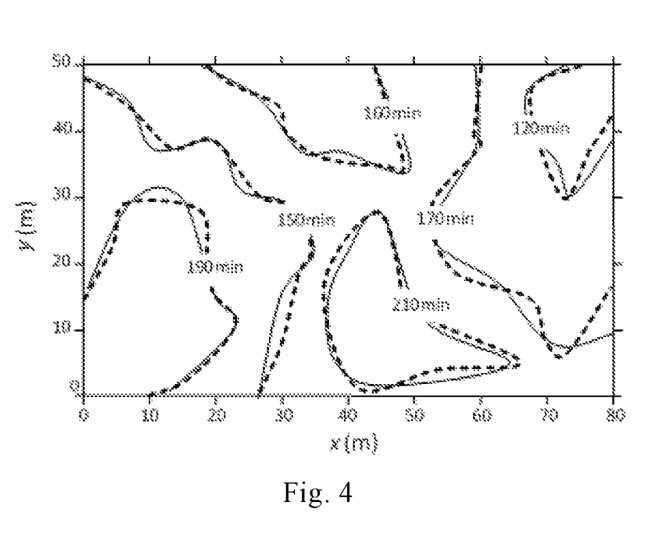
FIG. 4 is a comparison diagram between simulated values and measured values of a surface water flow recession process according to the embodiment 2.
Figure 5:
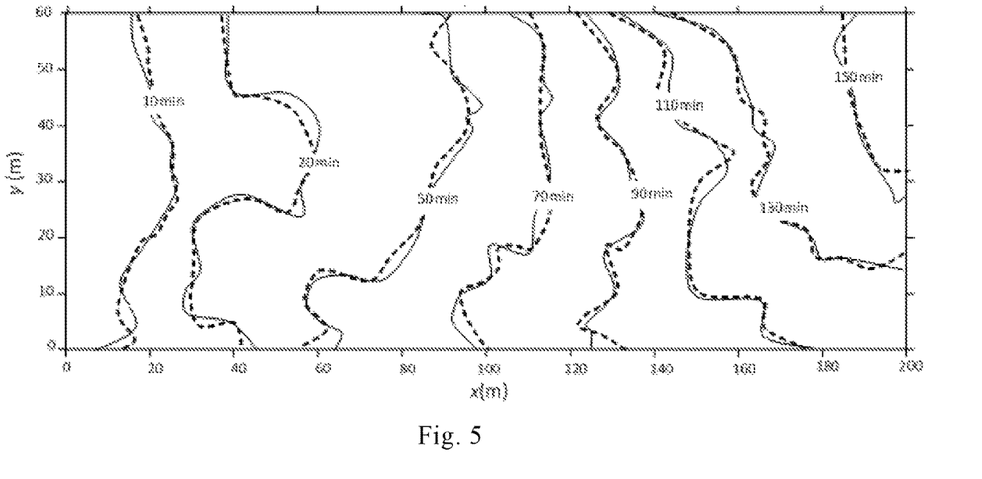
FIG. 5 is a comparison diagram between simulated values and measured values of a surface water flow advance process according to an embodiment 3.
Figure 6:
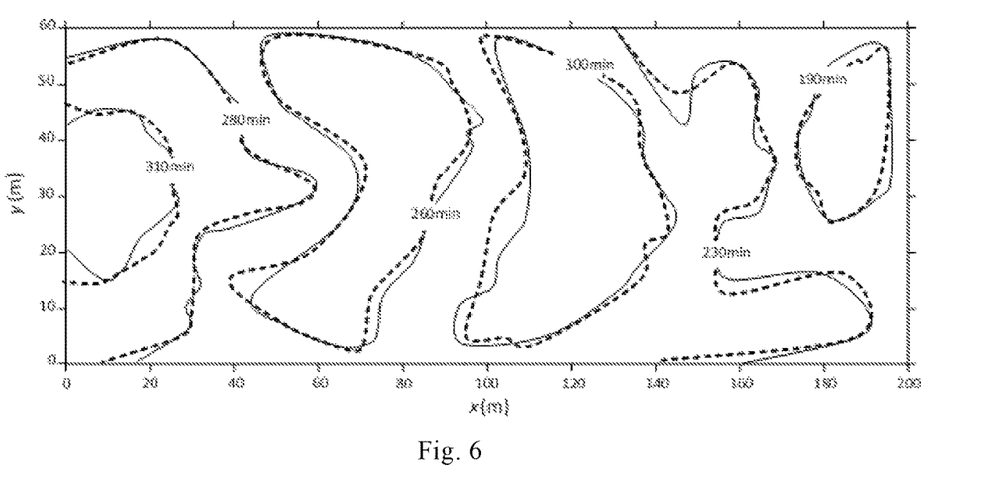
FIG. 6 is a comparison diagram between simulated values and measured values of a surface water flow recession process according to the embodiment 3.

Referring to the data in table 4 and in combination with FIGS. 1-6, it can be seen that the average relative errors between the simulated values and the measured values of the advance time and the recession time of the surface water flow obtained by the simulation method provided by the present invention are obviously smaller than those obtained by the related simulation method. Especially, with the increase of the size of the target border check, the average relative errors in the related simulation method are gradually increased, while the average relative errors in the simulation method provided by the present invention do not change significantly. Therefore, the simulation method provided by the embodiments of the present invention is higher in accuracy, and is suitable for target border checks of various sizes and inflow types.

Embodiment 5

In this embodiment, mass conservation in both the simulation method provided by the present invention and the related simulation method presented in Comparative Embodiment 1 is evaluated, respectively.

With respect to the mass conservation, the sum of a simulated surface residual water value and a simulated value of water infiltrating into the soil, which are calculated from the simulated surface water depth value, should be the same as the total amount of water actually flowing into a target border check. Thus, an error (namely, a water balance error) between the sum of the simulated surface residual water value and the simulated value of the water infiltrating into the soil and the total amount of the water actually flowing into the target border check can reflect the accuracy of the simulation method.

A calculation formula of the water balance error is shown as follows:

$$e_q = \frac{|Q_{in} - (Q_{surface} + Q_{soil})|}{Q_{in}} \times 100\%.$$

Here, $Q_{in}$ represents the total amount of the water actually flowing into the target border check, with the unit of m$^3$; $Q_{surface}$ represents the simulated surface residual water value; and $Q_{soil}$ represents the simulated value of the water infiltrating into the soil, with the unit of m$^3$.

The water balance errors in the embodiments 1-3 and the comparative embodiments 1-3 are shown in table 5.

TABLE 5

|  | Water balance error $e_q$ |
| --- | --- |
| Embodiment 1 | 0.0087 |
| Comparative embodiment 1 | 1.1 |
| Embodiment 2 | 0.0091 |
| Comparative embodiment 2 | 3.3 |
| Embodiment 3 | 0.0091 |
| Comparative embodiment 3 | 5.3 |

It can be seen from the data in table 5 that the water balance errors in the simulation method provided by the embodiments of the present invention are obviously smaller than those in the related simulation method, and are three orders of magnitude less than those in the related simulation method approximately, which also indicates that the simulation method provided by the embodiments of the present invention is higher in accuracy.

In summary, in the simulation method of the surface water flow movement process in the surface irrigation, provided by the embodiments of the present invention, the surface water flow movement process in the surface irrigation is simulated by solving the improved full hydrodynamic equations with a parabolic mathematical property. Compared with the related simulation method in which the surface water flow movement process in the surface irrigation is simulated by solving the classical full hydrodynamic equations with a hyperbolic mathematical property, the simulation method provided by the embodiments of the present invention is higher in accuracy. Meanwhile, in comparison with the classical full hydrodynamic equations, the numerical solution of the improved full hydrodynamic equations is easier, improving the simulation efficiency of the surface water flow movement process in the surface irrigation. In addition, the simulation method provided by the embodiments of the present invention is wider in application range and higher in application value.

The numbers of the above embodiments are only for the sake of the description of the present invention, and do not represent the priority of the embodiments.

The foregoing descriptions are only preferred embodiments of the present invention, and do not intend to limit the present invention. Any variation, equivalent substitution and modification that fall within the spiritual and principle of the present invention should be embraced by the protective scope of the present invention.

The invention claimed is:

1. A simulation method of a surface water flow movement process in surface irrigation, the simulation method comprising:

step a, acquiring surface relative elevation data, border surface roughness coefficient data and surface water infiltration rate data of a target border check;

step b, substituting the surface relative elevation data, the border surface roughness coefficient data and the surface water infiltration rate data into improved full hydrodynamic equations, and performing numerical solution on the improved full hydrodynamic equations to obtain a simulated surface water depth value and simulated values of vertical integral average velocities of an irrigation water flow in x-coordinate and y-coordinate directions of a certain measurement site in the target border check at a certain time, wherein the improved full hydrodynamic equations are expressed as:

$$\frac{\partial \zeta}{\partial t} = \frac{\partial}{\partial x}\left[K_w \frac{\partial \zeta}{\partial x}\right] + \frac{\partial}{\partial y}\left[K_w \frac{\partial \zeta}{\partial y}\right] -$$
$$\frac{1}{g}\left\{\frac{\partial}{\partial x}[(\zeta-b)C_x K_w] + \frac{\partial}{\partial y}[(\zeta-b)C_y K_w]\right\} - i_c,$$

$$\frac{\partial \zeta}{\partial x} + u\frac{n^2\sqrt{u^2+v^2}}{h^{4/3}} = -C_x,$$

$$\frac{\partial \zeta}{\partial y} + v\frac{n^2\sqrt{u^2+v^2}}{h^{4/3}} = -C_y, \text{ and}$$

$$K_w = \frac{h^{5/3}}{n\left[\left(\frac{\partial \zeta}{\partial x}+C_x\right)^2 + \left(\frac{\partial \zeta}{\partial y}+C_y\right)^2\right]^{1/4}},$$

wherein h represents the surface water depth with the unit of m; x and y are spatial coordinates in two orthogonal directions respectively; u and v respectively represent the vertical integral average velocities of the irrigation water flow in the x-coordinate and y-coordinate directions, with the unit of m/s; g represents a gravitational acceleration with the unit of m/s$^2$; $\zeta$ represents the surface relative water level elevation with the unit of m, and $\zeta$ equals the surface water depth h plus a surface relative elevation b; n is the border surface roughness coefficient with the unit of s/m$^{1/3}$; $i_c$ represents the surface water infiltration rate with the unit of m/s; and step c, obtaining simulated values of unit width discharge of the irrigation water flow in the x-coordinate direction and y-coordinate directions, respectively, according to the simulated surface water depth value, the simulated value of the vertical integral average velocities of the irrigation water flow in the x-coordinate direction, and the simulated value of the vertical integral average velocities of the irrigation water flow in the y-coordinate direction, wherein in step a, the acquisition of the surface relative elevation data of the target border check in particular includes: measuring the surface relative elevation data by a level gauge at a predetermined interval distance, wherein the predetermined interval distance is 5 m.

2. The simulation method of claim 1, wherein in step c, the simulated values of the unit width discharge of the irrigation water flow in the x-coordinate direction and y-coordinate directions are calculated by use of following equations:

$$q_x = h \cdot u, \text{ and}$$

$$q_y = h \cdot v,$$

wherein $q_x$ and $q_y$ respectively represent the unit width discharges of the irrigation water flow in the x-coordinate and y-coordinate directions, with the unit of m³/(s·m); h represents the surface water depth with the unit of m; and u and v respectively represent the vertical integral average velocities of the irrigation water flow in the x-coordinate and y-coordinate directions, with the unit of m/s.

3. The simulation method of claim 1, wherein in step a, the acquisition of the surface water infiltration rate data of the target border check particularly includes:

acquiring an infiltration parameter of a Kostiakov infiltration empirical equation and a dimensionless infiltration parameter of the Kostiakov infiltration empirical equation, and calculating the surface water infiltration rate data of the target border check according to the Kostiakov infiltration empirical equation, wherein the Kostiakov infiltration empirical equation is $i_c = \alpha k_{in} \tau^{\alpha-1}$, $i_c$ represents the surface water infiltration rate with the unit of m/s; $\alpha$ is the dimensionless infiltration parameter of the Kostiakov infiltration empirical equation; $k_{in}$ is the infiltration parameter of the Kostiakov infiltration empirical equation, with the unit of cm/min$^\alpha$, and z represents water infiltration time with the unit of s.

4. The simulation method of claim 3, wherein in step c, the simulated values of the unit width discharge of the irrigation water flow in the x-coordinate direction and y-coordinate directions are calculated by use of following equations:

$$q_x = h \cdot u, \text{ and}$$

$$q_y = h \cdot v,$$

wherein $q_x$ and $q_y$ respectively represent the unit width discharges of the irrigation water flow in the x-coordinate and y-coordinate directions, with the unit of m³/(s·m); h represents the surface water depth with the unit of m; and u and v respectively represent the vertical integral average velocities of the irrigation water flow in the x-coordinate and y-coordinate directions, with the unit of m/s.

5. The simulation method of claim 3, wherein the infiltration parameter of the Kostiakov infiltration empirical equation and the dimensionless infiltration parameter of the Kostiakov infiltration empirical equation are determined by use of a double ring infiltration method.

6. The simulation method of claim 5, wherein in step c, the simulated values of the unit width discharge of the irrigation water flow in the x-coordinate direction and y-coordinate directions are calculated by use of following equations:

$$q_x = h \cdot u, \text{ and}$$

$$q_y = h \cdot v,$$

wherein $q_x$ and $q_y$ respectively represent the unit width discharges of the irrigation water flow in the x-coordinate and y-coordinate directions, with the unit of m³/(s·m); h represents the surface water depth with the unit of m; and u and v respectively represent the vertical integral average velocities of the irrigation water flow in the x-coordinate and y-coordinate directions, with the unit of m/s.

7. The simulation method of claim 1, wherein the acquisition of the border surface roughness coefficient data of the target border check particularly includes: observing surface water depth of the target border check to acquire surface water depth observation data of the target border check, and estimating the border surface roughness coefficient according to the surface water depth observation data.

8. The simulation method of claim 7, wherein in step c, the simulated values of the unit width discharge of the irrigation water flow in the x-coordinate direction and y-coordinate directions are calculated by use of following equations:

$$q_x = h \cdot u, \text{ and}$$

$$q_y = h \cdot v,$$

wherein $q_x$ and $q_y$ respectively represent the unit width discharges of the irrigation water flow in the x-coordinate and y-coordinate directions, with the unit of m³/(s·m); h represents the surface water depth with the unit of m; and u and v respectively represent the vertical integral average velocities of the irrigation water flow in the x-coordinate and y-coordinate directions, with the unit of m/s.

9. The simulation method of claim 1, wherein in step b, the numerical solution of the improved full hydrodynamic equations is performed by use of a finite volume method.

10. The simulation method of claim 9, wherein in step c, the simulated values of the unit width discharge of the irrigation water flow in the x-coordinate direction and y-coordinate directions are calculated by use of following equations:

$$q_x = h \cdot u, \text{ and}$$

$$q_y = h \cdot v,$$

wherein $q_x$ and $q_y$ respectively represent the unit width discharges of the irrigation water flow in the x-coordinate and y-coordinate directions, with the unit of m³/(s·m); h represents the surface water depth with the unit of m; and u and v respectively represent the vertical integral average velocities of the irrigation water flow in the x-coordinate and y-coordinate directions, with the unit of m/s.

* * * * *